United States Patent [19]

Inoue et al.

[11] Patent Number: 4,783,489

[45] Date of Patent: Nov. 8, 1988

[54] MANUFACTURING PROCESS OF POROUS RESIN MOLD CONTAINING CONTINUOUS HOLES AND CASTING MOLD

[75] Inventors: Saihachi Inoue; Shigeru Kiriyama; Kazuhiro Imada, all of Osaka, Japan

[73] Assignees: Inax Corp., Aichi; IN Technical Lab Co., Ltd., Osaka, both of Japan

[21] Appl. No.: 826,547

[22] Filed: Feb. 6, 1986

[30] Foreign Application Priority Data

Feb. 13, 1985 [JP] Japan .................. 60-27239

[51] Int. Cl.$^4$ .................. C08G 59/18; C08J 9/28; C08K 5/10
[52] U.S. Cl. .................. 521/63; 264/41; 521/116; 521/117; 521/178
[58] Field of Search .................. 521/63, 62, 178, 116, 521/117; 523/404, 414, 420

[56] References Cited

U.S. PATENT DOCUMENTS

| | | | |
|---|---|---|---|
| 3,213,044 | 10/1965 | Wagner | 521/63 |
| 3,669,911 | 6/1972 | Najvar | 521/62 |
| 3,825,506 | 7/1974 | Carter | 521/62 |
| 3,870,666 | 3/1975 | Becker | 523/404 |
| 3,929,685 | 12/1975 | Jung | 521/62 |
| 3,945,964 | 3/1976 | Hastings | 260/29.6 |
| 4,464,485 | 8/1984 | Kishima | 521/178 |

FOREIGN PATENT DOCUMENTS

| | | | |
|---|---|---|---|
| 0025139 | 8/1980 | European Pat. Off. | |
| 2511587 | 10/1975 | Fed. Rep. of Germany | 523/420 |
| 51-46131 | 3/1974 | Japan | |
| 51-13896 | 2/1976 | Japan | 523/404 |

OTHER PUBLICATIONS

*The Merck Index*, 9th edition, pp. 1128 and 1129; Merck & Co. Inc., Rayway N.J., 1976.
Chemical Abstracts, vol. 83, No. 8, Aug. 1975, p. 90, Abstract No. 60480e.
Chemical Abstracts, vol. 83, No. 22, Dec. 1975, p. 71, Abstract No. 180505p.

*Primary Examiner*—C. Warren Ivy
*Attorney, Agent, or Firm*—Austin R. Miller

[57] ABSTRACT

The first invention relates to a novel manufacturing process of mold containing continuous holes and used for filter materials, gas dispersive materials, and mold materials. By this invention, the epoxy resin mixture including an epoxy compound having one or more epoxy groups in each molecule, a hardener which reacts with and hardens the epoxy compound, emulsifiers, water or water-surface active agent, and fillers respectively is used as the molding material. As the emulsifier, at least two kinds of three different kinds of nonionic emulsifiers of 4-8, 8-17, and 11-15.6 HLB respectively are used together. This is the primary feature of the invention and no molding materials including such emulsifiers are known so far. The molding material is cured to a desired shape to prepare a mold containing continuous holes and for molding, conventional methods such as hardening after casting, for example, are adopted.

The second invention relates to a novel casting mold suitable be for slip discharge casting. By slip discharge casting, slip is supplied to the casting space of a mold having continuous holes, and the slip is pressurized to discharge the moisture content in the slip outside the casting mold to obtain hollow mold. The molding material used for this invention is prepared by process of the 1st invention so as to include 20–50 parts by weight of hardener to 100 parts by weight of the epoxy compound, 30 parts by weight or less of emulsifier to 100 parts by weight in total of the epoxy compound and the hardener, 1–20 parts by weight of water or water-surface active agent, and 30–75 parts by weight filler in the mixture used for molding. The casting mold of this invention can be obtained by curing the material for molding to a desired shape.

8 Claims, 2 Drawing Sheets

MANUFACTURING PROCESS OF POROUS RESIN MOLD CONTAINING CONTINUOUS HOLES AND CASTING MOLD

BACKGROUND OF THE INVENTION

This invention relates to a process of manufacturing a porous resin molded product containing continuous holes, which is used for filtering media, gas dispersive materials, and for mold materials, and further relates to a casting mold, which contains continuous holes, suitable for slip discharge casting.

Porous resin molds containing continuous holes have generally been used as filtering media, gas dispersive materials, and for mold materials. When such molded products are used as filtering media, accurate reproduction of pore diameter and porosity are essential. At the same time, the porous resin molded products containing continuous holes should fully meet the requirements of highly important characteristics such as mechanical properties, dimensional stability, and durability.

The methods for manufacturing porous resin molded products containing continuous holes adopted so far, however, have failed to meet the requirements because of problems as described in the following text. Consequently, the obtained porous resin molded products containing continuous holes could be used in a limited range only. When made by the method which uses a non-organic powder, for example, the obtained molded product is very brittle and is often chipped or cracked at remolding. As it requires high-temperature baking, large sized molded products become cracked in almost all cases. In the metal powder baking method, even dispersion of the metal powder is difficult to achieve and pore diameter and porosity tend to be locally non-homogeneous due to transfer and gathering of the metal powder upon baking. This makes it hard to reproduce the pore diameter and porosity with high accuracy. The method which uses plaster or cement is very handy since molding can be performed by casting. Accordingly, plaster is used popularly as a material for making porous resin molds containing continuous pores. Molds made by using materials that are reactive to hydration, such as plaster and cement, however, have such problems as low durability and low resistance to chemicals. To solve these problems, an improved method comprising addition of a synthetic resin or an emulsion or solution of a synthetic resin has been studied. Since even dispersion of synthetic resin or the emusion solution is difficult, the improved method is still subjected to major problems such as inferior reproduction of pore diameter and porosity, and contraction of the mold.

Besides the manufacturing methods as mentioned above, another process which uses epoxy resin of water dispersion system is shown in Publication No. 53-2464 of Japanese Patent. As an aliphatic polyamide is used as the hardener, a compound of high fluidity for molding is not obtained unless dispersed with a large quantity of water. Accordingly, it takes rather a long curing time from casting to remolding and the mold is greatly contracted upon heating and evaporation, which causes a serious problem in dimensional stability. When a filter is added for adjustment of the molding mixture to solve the problem, fluidity of the mixture is lowered making casting difficult, the mechanical characteristics of the obtained mold are lowered, and the weight is also increased. Accordingly, the method is applicable to manufacturing molds of limited shapes and dimensions only.

An improved version of the method of Japanese Patent Publication No. 53-2464 is also shown in Provisional Publication No. 59-71339. The improved method is characterized by the use of aliphatic polyamide as the condensation product of a mono-fatty acid and amine used in addition to the polymerized aliphatic polyamide used as the hardener in Publication No. 53-2464, so as to obtain a porous material containing continuous holes of a desired average pore diameter. As the condensation product of fatty acid and amine is used as a hardener, as mentioned above, the epoxy resin slip with these kinds of hardeners must be water in oil type of emulsion to gain a certain viscosity capable of casting and accordingly, the added quantity of water reaches the high percentage of the epoxy resin slip. This extends the curing time and the mold is greatly contracted, which causes a serious problem in dimensional stability. Another problem is still left unsolved in view of production of a porous article containing continuous holes at a high reproduction accuracy.

In Japanese Patent Publication No. 51-46131, a manufacturing method is disclosed, which is characterized by the use of epoxy resin and a specific and sole emulsifier. As is seen hereinafter in the examples for comparison, this method has a problem of uneven pore diameter due to unstable dimensions of the obtained porous material. When a filler is used in addition, the emulsion is subjected to water release in the middle of curing because a sole emulsifier does not function to stabilize the emulsion.

Japanese Patent Publication No. 55-19723 shows a method to use polymethyl methacrylate of powder form in the main. This method is also subjected to such problems as contraction due to unstable dimensions of the obtained mold as polymethyl methacrylate is used for emulsion polymerization, and lower mechanical properties and heat resistance than the method with epoxy resin. The description of this manufacturing process includes no statement of the embodiment where any filter is used.

On the other hand, slip discharge casting is a method adapted to make hollow molds. By this method, slip is supplied into the cast space of a casting mold which can be separated and has continuous pores, the slip is pressed to discharge water content in the slip outside the casting mold, and the solid matter is deposited inside the casting mold. Then the casting mold is separated to obtain a hollow mold. If the casting mold for this method is made of plaster, the durability and resistance to chemicals are inferior. If the mold is made by the method of Japanese Patent Publication No. 53-2464, on the other hand, the problem of unstable dimensions results. For manufacturing a mold, therefore, either method is unfavorable and a more suitable casting mold to slip discharge casting has been desired.

SUMMARY OF THE INVENTION

The manufacturing process for making a porous resin mold containing continuous holes is a method of obtaining a mold of homogeneous and continuous pores, excellent dimensional stability, mechanical properties, and durability by cast molding. The purpose is realized by using the epoxy resin mixture as the molding material, which contains respectively an epoxy comound having one or more epoxy groups in mole molecule and a hardener which reacts with and hardens the epoxy compound having one or more epoxy groups in one molecule and, the emulsifier being made of at least two kinds of three different nonionic emulsifiers having HLB values (hydrophile-lipophile balance values) of 4–8, 8–17, and 11–15.6 respectively, water or water surface active agent, and a filler respectively.

The casting mold of this invention is a mold suitable for slip discharge casting and has homogeneous and continuous pores, excellent dimensional stability, mechanical properties, durability, and resistance to water. The purpose is realized by making the mold with a molding material which contains an epoxy compound having one or more epoxy groups in each molecule and a hardener which reacts with and hardens the epoxy compound, nonionic emulsifiers of three different kinds with hydrophile-lipophile balances of 4–8, 8–17, and 11–15.6 respectively, water or a water surface active agent, and a filler respectively, and at the ratio of 20 to 50 parts by weight of hardener to 100 parts by weight of epoxy compound, 30 parts by weight or less of emulsifiers to 100 parts by weight of hardener in total, 1 to 200 parts by weight of water or water surface active agent, and 30 to 75 weight percent of filler in the mixture for molding respectively.

DETAILED DESCRIPTION OF THE INVENTION

As described earlier, an epoxy compound having one or more epoxy groups in one molecule is used to make the resin mold containing continuous holes. As the epoxy compound, a diglycidyl ether of the bisphenol A type or of the bisphenol F type is generally considered advantageous. Where molds with high resistance to chemicals and heat are required, in particular, it is advisable to use a polyfunctional epoxy resin such as polyglycidyl ether derived from phenolic novolak or from cresol novolak or triglycidyl ether of trimethylol propane (TMP), glycidyl ester from such acid anhydrides as vinylcyclohexane dioxide, tetrahydro-phthalic anhydride (THPA), and hexahydro-phthalic acid (HHPA), or a heterocyclic epoxy resin such as an epoxy resin of hydantoin base. As the epoxy compound applicable to flexibility or viscosity control, a mono or diglycidyl ether or ester generally called a reactive diluent or plastic epoxy resin, such as fatty glycidyl ether represented by butyl glycidyl ether, aromatic glycidyl ether such as cresyl glycidyl ether (CGE) phenyl glycidyl ether, glycidyl ether derived from high grade alcohol and glycol, and glycidyl ester derived from fatty acid may be used. Where molds of particularly high incombustibility are required an, epoxy resin which contains Br in the molecules may be used, such as tetrabromo bisphenol A diglycidyl ether and dibromo phenyl (or cresil) glycidyl ether.

In the manufacturing process of the present invention, such epoxy compounds as stated above may be used independently or several kinds may be added into a mixture as required. The epoxy compound is referred to as the resin component hereinafter in this patent specification.

The applicable hardener includes an aliphatic polyamine such as Diethylene triamine (DETA), Triethylene tetraamine (TETA), m-xylylene diamine (m-XDA) and trimethyl hexamethylene diamine (TMD), alicyclic polyamine such as Isophorone diamine (IPD), N-aminoethyl piperazine and Imidazole compound, aromatic polyamine such as Diaminodiphenyl methane (DDM), Diamino-diphenyl sulfone (DADPS) and m-phenylenediamine, polyamide such as the polycondensate of basic acid and polyamine, and others. Such compounds may be used independently or several kinds may be mixed for use as required. The polymer, polycondensate, or adduct of the above mentioned compounds used independently or as a mixture of two or more kinds with at least any one of formalin, acrylic acid, polyols, phenols, polyesters, oxides, mono or di or polyglycidyl ether may be used as the hardener. Favorable hardeners are the adduct of independent or compounds of amines or amides with glycidyl ether and polyphenol, or the polycondensates with basic acids and formalin. The adduct of aliphatic polyamine, glycidyl ether, and polyphenol, the adduct of aliphatic polyamine, aromatic polyamine, glycidyl ether and polyphenol, and the adduct of dicyandiamide, aliphatic polyamine, glycidyl ether, and polyphenol are also suitable hardeners used for the present invention.

Following now is the description of the emulsifiers.

It is well known that epoxy resin mixtures can be emulsified by using an adequate quantity of a selected emulsifier. Within the knowledge of the inventors, however, the object of the invention to obtain a mold having homogeneous holes and porosity and excellent dimensional stability and mechanical strength can hardly be realized by using any known emulsifier independently, such as the copolymer of polyoxyethylene, polyoxypropylene, and block copolymers such as $HO(CH_2CH_2O)_l$—$[CH(CH_3)CH_2O]_m$—$(CH_2CH_2O)_nH$, for example disclosed in Japanese Patent Publication No. 51-46131. As a result of continued study of the emulsifiers which can realize the object of the present invention, the inventor found it works to combine at least two kinds out of three kinds of nonionic emulsifiers with hydrophile-lipophile balances (HLB) of 4–8, 8–17, and 11–15.6 respectively. Sorbitan aliphatic ester is a favorable example 4–8 HLB emulsifier, polyoxyethylene oleyl ether is a good example of 8–17 HLB emulsifier, and polyoxyethylene sorbitan aliphatic ether is a desirable example of 11–15.6 HLB emulsifier. At least two kinds of these must be used together, and it is more favorable to use three kinds respectively having HLB values of 4–8, 8–17, and 11–15.6. It is still better to use three kinds of sorbitan aliphatic ester, polyoxyethylene oleyl ether, and polyoxyethylene sorbitan aliphatic ester altogether. In using the resin components and hardeners described above, it is most favorable to set the HLB of the compound emulsifier at 13 to 14.5. The hydrophile-lipophile balance of the emulsifier used for the present invention is not in line with the commonly accepted emulsifier of 4–6.5 HLB in preparation of water in oil type epoxy emulsions.

It is preferable that the emulsifier used for the present invention can be added to either one or both of the resin component and hardener besides the requirement to meet the above stated conditions and has a high storage stability even under conjugate conditions with the resin component and hardener component, as the emulsifier is easier to use when mixed with the resin component or the hardener in advance.

The quantity of emulsifier to be added should preferably be 30 parts by weight or less, to the total weight unit of 100 of the resin component and the hardener, and 2 to 15 parts by weight per 100 are still better.

The quantity of water or water-surface active agent solution to be added for the present invention should preferably be 1–200 parts by weight to the total parts by weight of 100 of the resin component and hardener, and 10–80 parts by weight per 100 are still better. Two component type emulsions such as epoxy resin are subjected to water release when filler of over a fixed quantity is added as the filler is coagulated again or the colloid is broken quickly depending on the kind of the filler. The phenomenon of water release presented in some specific kinds of fillers is publicly known and to prevent water release, of surface active agent is used as required. The surface active agent used for the present invention is not only the typical one called a surfactant but also the agents for better solution of fillers such as dispersants of aqueous pigments in water. The surface active agent improves wetting of fillers with water and also functions as a protective colloid. On checking various kinds, the surface active agents of the fluorine series are found most effective. Examples of fluorine series surface active agents are fluorochemical surfactants derived from hexafluoropropene oligomer and fluorochemical surfactants of the fluoroalkyl polyoxyethylene type. The quantity of surface active agent to be added may be changed adequately according to the quantity of filler, but 30 parts by weight or less to 100 parts by weight of water is preferable, and less than 10 parts by weight is still better. When the kind and added quantity of the filler are fixed, a fixed quantity of surface active agent may be added preliminary to the resin component or the hardener, as required.

Now follows a description of the fillers.

The kind of filler, particle size, and added quantity are the factors which greatly affect the characteristics of the mold, besides the quantity of water to be added. The type of fillers used for the present invention is not particularly limited so long as they are of the type ordinarily used for modification of synthetic resins. For example, silica sand, quartz sand, calcium carbonate, talc, barium sulfate, clay, or aluminium hydroxide may be used and pigments such as titanium oxide and chromic oxide are also used. Dolomite and ceramic powder may also be used. Nonorganic fillers such as alumina, glass beads, pearl sand, and Ottawa sand, and organic fillers like phenol resin spheres and epoxy resin spheres may be used. Fillers of certain particle range such as 60–100 mesh, 100–200 mesh, 200–300 mesh or smaller than 300 mesh and of spherical shape or similar shape are preferable. The above mentioned non-organic fillers such as alumina and Ottawa sand, and the organic fillers like phenol resin spheres and epoxy resin spheres can be used. When it is intended to make a mold to which accurate pore diameter and porosity are essential, the object can be realized by using a filler having a certain range of particle size and a spherical or similar shape independently, or several kinds of such fillers together. The preferred quantity of filler is to be added 30–75 weight percent of all the mixture for molding.

The raw materials as described above are mixed to prepare the aqueous epoxy resin mixture, which is used for molding.

To extinguish the bubbles formed when the raw materials are stirred, a defoaming agent having a defoaming or foam breaking function is used as required. To make molded articles which have intricate and detailed patterns on the surface, a defoaming agent may be applied to the mold in advance so as to prevent foaming on the parts of the intricate and detailed patterns. Defoaming agents of silicone series, non-silicone series, and for water emulsion are available. It is preferable, however, to use isoamyl alcohol or Contrasspum (by Schwegann).

Porous resin molds containing continuous holes can be made by casting the above described molding material, then by gelling, by heating, and completely curing simultaneously with evaporation.

The porous resin mold has homogeneous and continuous pores, stable dimensions, good mechanical properties and durability, and is resistant to water. Moreover, it is possible to obtain a mold of high resistance to chemicals, to heat and of high incombustibility by selecting the type of epoxy compound adequately as described above, to obtain a mold of accurate pore diameter and porosity by selecting the quantity of added water and the type of filler, and to make the manufacturing time shorter by gelling the molding material in a shorter time through adequate selection of the hardener, so as to improve heat resistance.

Further description is now given referring to some examples of embodiments, of comparison and of reference.

For embodiments 1–11, the raw materials are used in the compounding ratio shown in Table 1.

The epoxy compound and the emulsifier, however, are mixed in advance. In the Table, the epoxy compound A is a mixture of 85 parts by weight of and 15 parts by weight of glycidyl ether, epoxy compound B is a mixture of 85 parts by weight of the foregoing epoxy compound and 15 parts by weight of trimethylolpropanetriglycidyl ether (by Kyoueisha Yushi Co., Ltd.), emulsifier A is a mixture of 40 parts by weight of polyoxyethylene oleyl ether and 60 weights parts by weight of polyoxyethylene sorbitan mono-oleate, emulsifier B is a mixture of 25 parts by weight of polyoxyethylene oleylether, 60 parts by weight of polyoxyethylene sorbitan monooleate, and 15 parts by weight of sorbitan mono-olyeate, hardener A is adduct a 50 parts by weight of aliphatic polyamine, 30 parts by weight of glycidyl ether, and 20 parts by weight of polyphenol, hardener B is adduct a of 25 parts by weight of aliphatic polyamine, 30 parts by weight of aromatic polyamine, 25 parts by weight of glycidyl ether, and 20 parts by weight of polyphenol, and hardener C is the adduct of 28 parts by weight of dicyanadiamide, 30 units of aliphatic polyamine, 22 units of glycidyl ether, and 20 units of polyphenol. In the water-surface active agent, the ratio of surfactant is 5 wt.% (2.5 parts by weight in 50 parts by weight). As the surface active agent, fluorochemical surfactants derived from hexafluoropropene oligomer is used. The ceramic powder A is of 100–200 mesh particle size, ceramic powder A-2 is of 250 mesh or smaller particle size, silica sand A is spherical type of 80 mesh particle size, and silica sand B is spherical type of 300 mesh or smaller particle size.

In the embodiments 1 to 8, and 11, the porous resin molds containing continuous holes are made in the following method. First, the hardener is added to the mixture of epoxy compound and the emulsifier, then the mixture is stirred fully to make it into an even emulsion while gradually adding water or water-surface active agent. The filler is added to the emulsion, and an even mixture is made by full stirring, which is used as the molding material. The molding material is poured into a polystyrol container of 85×85×50 mm (2 mm thick with a projection of 45 mm dia. and 7 mm height on the bottom, and a heat resistance of 70° C.). Then the cover of the container is closed after adjusting exactly to a 50 mm height with a doctor blade. As shown in Table 1, gelation of the compound is completed in 25 to 45 minutes. After confirming gelation, curing is advanced by heating at 50° C. for two hours. After cooling gradually down to room temperature, the molded article is remolded. A water adsorbing mold is obtained already at this point. After that, the mold is heated for 3 hours at 80° C. for full curing and evaporation to obtain a porous resin mold containing continuous holes.

In embodiments 9 and 10, the porous resin mold containing continuous holes are obtained in the same manner as for embodiment 1 to 8 except for the following curing conditions. In embodiment 9, gelation is carried out at 40° C., curing is advanced by heating for two hours at 60° C., then the article is released from the mold to be heated further for two hours at 80° C. and another three hours at 120° C. to complete curing. In embodiment 10, gelation is carried out at 45° C., curing is advanced by heating for three hours at 60° C., then the mold is remolded from the mold to be heated further for one hour at 80° C., another hour at 100° C., still other two hours at 150° C. and three hours at 150° C. to complete curing. As shown in Table 1, the time of gelation for embodiment 1 to 11 is very short as the hardeners A-C are used.

For the examples for comparison 1 and 2, the raw materials are mixed at the compounding ratio shown in Table 2. However, is used as the epoxy compound, phenylglycidyl ether (PGC, epoxy resin diluent by Nippon Kayaku) as a diluent, the block copolymer of polyoxyethylene and polyoxypropylene as the emulsifier C and D, $HO(CH_2CH_2O)_l—[CH(CH_3)CH_2O]_m—(CH_2CH_2O)_nH$ as the emulsifier C, polyoxyethylene polyoxypropylene block polymer as the emulsifier D, and modified aliphatic polyamine as the hardener D respectively.

In both examples for comparison 1 and 2, the obtained compounds of raw materials are subjected to complete water release, and a porous resin mold containing continuous holes cannot be made.

In the example for reference, the mold is made via the following procedure by using plaster. Plaster of 100 parts by weight is added little by little to 75 units of 10° C. water, then the mixture is stirred for five minutes with an agitator at about 300 rpm. Then the obtained compound is poured into a container in the same manner as for the embodiments, hardened for 5 days at normal temperature, then the hardened article is used as the mold for reference.

The molds obtained by embodiments 1 to 11 were checked for such characteristics as water adsorption speed, shrinkage, average pore diameter, and heat deflection temperature. For the articles of example for comparison 1 and 2, the measurement was not possible due to complete water release as mentioned above. The mesurements were made in the following manner.

(1) Water adsorption

Dents made on the bottom of the mold were kept upward and 2cc water was spread in the dents to measure the adsorption time of the water.

(2) Shrink

The value given by the following expression was calculated while taking the mold for reference stated above as the standard. Shrinkage (%)=(Volume of the mold of the embodiments/volume of the mold for reference with plaster)×100

(3) Average pore diameter

A porosimeter was used for the measurement. The mechanical strength (mechanical properties) was checked further in the following method.

(4) Mechanical strength

By using a die of 100×200×50 mm, porous resin molds were by the methods of Embodiment 1 to 11, and the obtained molds were cut into test pieces to check mechanical strength. The compressive strength was measured with test pieces of 20×20×20 mm and the bending strength was measured with test pieces of 40×40×160 mm.

The tests results are shown in Table 1. The water adsorption property of the plaster mold for reference was 37 seconds.

TABLE 1

(in weight unit)

| | | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 | Embodiment 11 |
|---|---|---|---|---|---|---|---|---|---|---|---|---|
| Epoxy compound | A | 100 | 100 | 100 | 100 | 100 | 100 | 100 | — | — | — | 100 |
| | B | — | — | — | — | — | — | — | 100 | 100 | 100 | — |
| Emulsifier | A | 6 | 6 | 6 | 6 | 6 | 6 | 6 | — | — | — | 30 |
| | B | — | — | — | — | — | — | — | 8 | 8 | 8 | — |
| Hardener | A | 25 | 25 | 25 | 25 | 25 | 25 | 25 | 30 | — | — | 25 |
| | B | — | — | — | — | — | — | — | — | 30 | — | — |
| | C | — | — | — | — | — | — | — | — | — | 25 | — |
| Water | | 50 | 70 | 30 | 50 | — | 50 | — | — | — | — | 60 |
| Water-surface active agent | | — | — | — | — | 50 | — | 50 | 50 | 50 | 50 | — |
| Filler Ceramic powder | A | 200 | 200 | 200 | — | — | — | — | — | — | — | — |
| | A-2 | — | — | — | 200 | — | — | — | — | — | — | — |
| Silica sand | A | — | — | — | — | 250 | — | 150 | — | — | — | 250 |
| | B | — | — | — | — | — | 170 | 50 | — | — | — | — |
| Zircon sand | | — | — | — | — | — | — | — | 500 | 500 | 500 | — |
| Gelation time (Minute) | | 30 | 45 | 25 | 30 | 30 | 30 | 30 | 25 | 45 | 45 | 45 |
| Water adsorption (sec.) | | 42 | 33 | 58 | 46 | 32 | 38 | 34 | 45 | 42 | 40 | 35 |
| Shrinkage (%) | | 99.88 | 100.02 | 99.57 | 99.92 | 99.54 | 100.08 | 99.87 | 100.08 | 99.96 | 99.52 | 98.92 |
| Compressive strength (kg/cm$^2$) | | 405 | 318 | 586 | 432 | 415 | 462 | 428 | 486 | 542 | 618 | 216 |
| Bending strength (kg/cm$^2$) | | 83 | 62 | 116 | 91 | 82 | 98 | 85 | 114 | 132 | 156 | 48 |
| Average pore diameter (micron) | | 1.05 | 1.57 | 0.43 | 0.62 | 2.15 | 1.24 | 1.56 | 0.85 | 0.88 | 0.92 | 1.32 |
| Heat deflection temp. (°C.) | | 52 | 48 | 54 | 52 | 54 | 53 | 53 | 60 | 98 | 124 | 38.5 |

TABLE 2

(in weight unit)

| | Example for Comparison 1 | Example for comparison 2 |
|---|---|---|
| Epoxy compound | 100 | 100 |
| Diluent | 20 | 20 |
| Emulsifier | | |
| C | 15 | — |
| D | — | 15 |
| Hardener D | 48 | 48 |
| Water | 60 | 60 |
| Silica sand A | 250 | 250 |

From Table 1, it is shown that the porous resin mold containing continuous holes obtained by embodiment 1-11 respectively have excellent mechanical characteristics and dimensional stability. The molds of embodiment 9 and 10 are highly resistive to heat as epoxy compounds having polyfunctional groups and heat resistive hardeners are used.

Regarding the method of making a porous resin mold containing continuous holes the casting method is applicable to produces a mold containing continuous and homogeneous pores of excellent dimensional stability, mechanical characteristics and durability because a hydrated epoxy resin compound is used, which contains an epoxy compound having at least one epoxy group in each molecule, hardener to react with the epoxy compound and to harden the epoxy compound, emulsifier made by mixing at least two kinds of three nonionic emulsifiers of HLB 4-8, 8-17, and 11-15.6 respectively, water or water-surface active agent solution, and filler.

This invention relates to a slip discharge casting method to obtain a hollow mold by supplying a slip into a separable casting mold having continuous holes, by applying pressure to the slip to discharge the moisture content of the slip toward the outside of the casting mold, by adhering the solid matter of the slip onto the inner face of the casting mold, then by separating the casting mold. The casting mold can be one produced by the process heretofore described, namely a porous resin mold containing continuous holes wherein the molding materials used are 20 to 50 parts by weight of hardener to 100 parts by weight epoxy compound, 30 parts by weight or less of emulsifier to 100 parts by weight of total epoxy compound and hardener, 1-200 parts by weight of water or water-surface active agent mixture, and 30-75 wt.% of filler in the compound for molding respectively.

The casting mold can be made suitable to the above described slip discharge casting method when provided with homogeneous and continuous holes, excellent dimensional stability, mechanical characteristics, durability, heat resistance and water resistance by using the molding materials in the specific ratio of compounding.

Except for the compounding ratio, the conditions described for the process of making the porous resin mold containing continuous holes are applicable.

Figure 1:
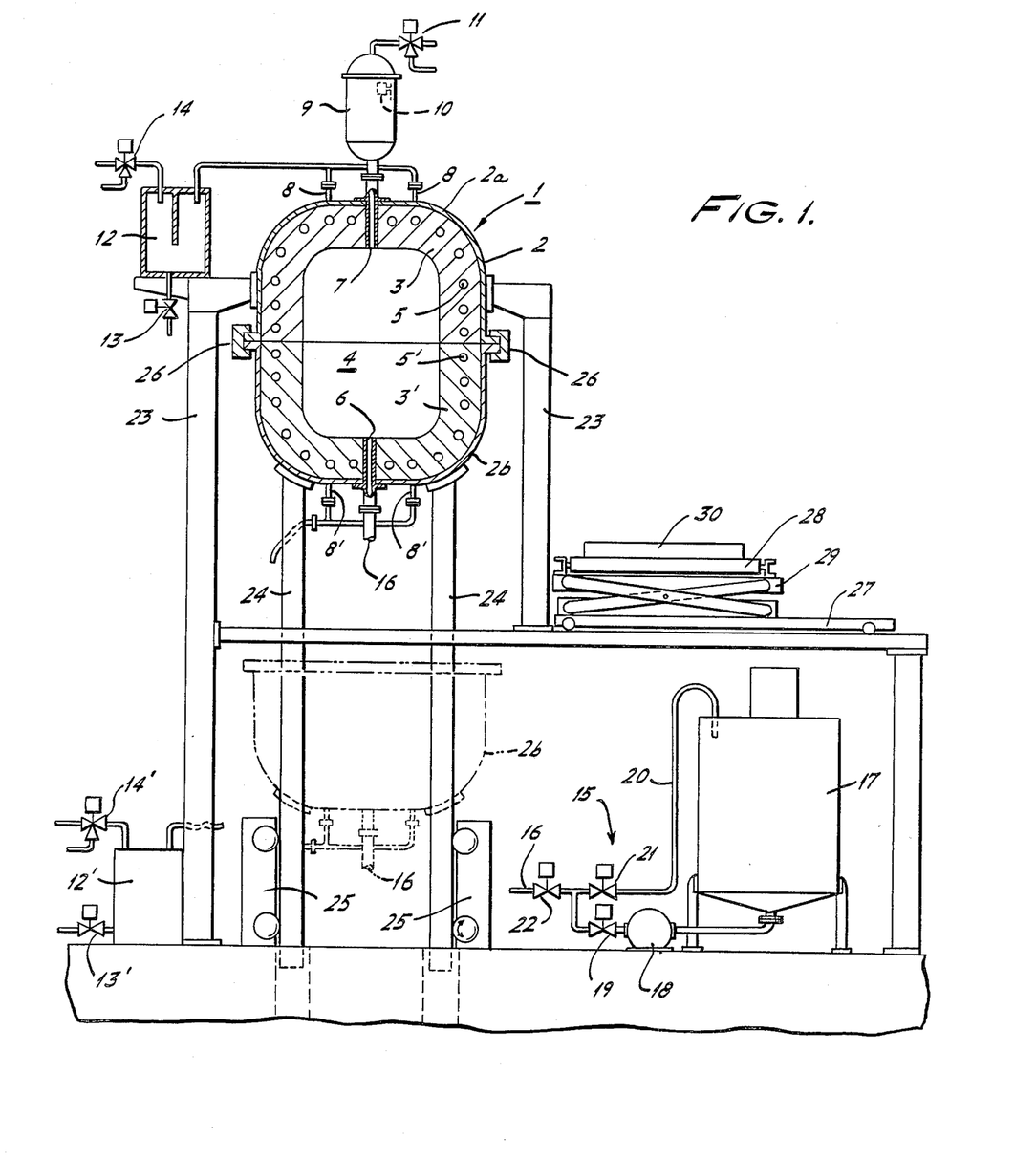
FIG. 1 is a sectional view of a part of the slip discharge casting mold.
Figure 4:
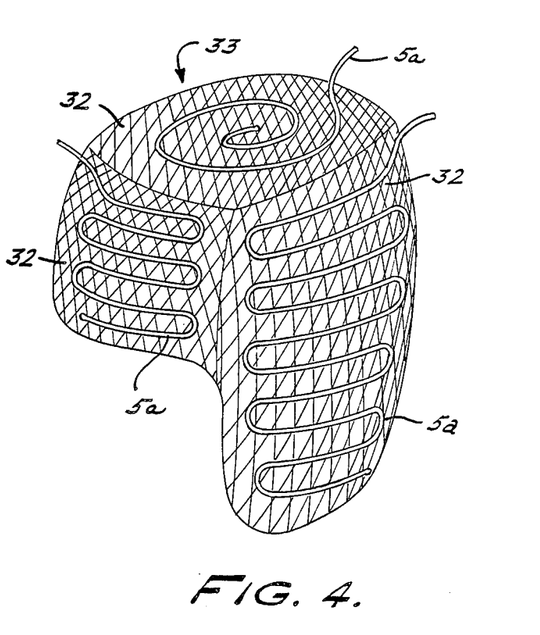
FIG. 4 is perspective view showing the discharge channel fixed onto a molded wire net.

The slip discharge casting is made by using a slip discharge casting equipment as shown, for example, in FIG. 1, and the casting mold of the invention is assembled in the slip discharge casting equipment as described in the following text. As shown in the drawing, the slip discharge casting equipment has a casting mold (1). The casting mold (1) is provided with a pressure resistive container (2) which can be separated into an upper container portion or hanger for a mold (2a) and other part or lower container portion (2b), and inner molds (filter layers) (3)(3') which can be divided into two parts when the pressure resistive container portions 2a and 2b are parted. The upper and lower inner molds 3,3' are provided inside the pressure resistive container (2) so as to form a casting space (4) of a desired shape. Water discharge channels (5)(5') having an opening at the outside of the pressure resistive container (2) are formed at an adequate spacing inside the inner molds (3)(3'). One end of a slip feed pipe (6) and a overflow pipe (7) is opened into said casting space (4), and the other end of the pipes (6) (7) is opened to the outside of the pressure resistive container (2). The hanger for mold (2a) of the pressure resistive container is fixed to struts (23, 23). The part (2b) is supported by lifting rods (24, 24) and can be moved up and down from the interlock position of the hanger for mold (2a) with the part (2b) to the stand-by position at the lower part shown by an alternate long and two short dashes line in the drawing. In the drawing, (25) is an up-down driving means to drive the lifting rods (24), and (26) is a clamp to connect the outward flanges of the hanger for mold (2a) and the part (2b) firmly at interlocking. For the casting equipment, the casting mold (1) is divided into two parts. However, it may also possible to compose the upper part (2a) or the lower part (2b) of the pressure container so as to be divided into two or more parts. Said inner molds (3, 3') are made of the molding material having the specific compounding ratio described above and into an article with continuous pores. The water discharge channels (5, 5') are made of an extraporous conductor having far smaller water filtration resistance than that of the upper and lower inner molds (3, 3'). Pipes made of woven cotton of 2 to 20 mm outside diameter, for example, are used as the conductors forming channels 5, 5'. The inner molds (3, 3') can be made, for example, by the following method. First, a wire net is pressed against the surface of a model molded larger than the casting mold by the distance between the surface of the inner molds (3, 3') and the discharge channels (5, 5') (40-100 mm for example) to obtain a wire net (32) (FIG. 4) of the shape corresponding to the shape of the inner molds (3, 3'). Then one or more pipes for the discharge channels (5a) (FIG. 4). are placed onto the wire net (32) with an adequate spacing (5-100 mm pitch between the pipes, for example) and are fixed with an adequate means such as a wire. The molding wire net (33) with pipe (5a) attached to it is housed into the upper part (2a) and the lower part 2b of the pressure container (2) of FIG. 1 respectively, then the end of the pipe (5a) for discharge channel forming is inserted into the pipeline of the external pipes (8, 8') (FIG. 1) respectively having an opening inside the pressure container (2). A corresponding part of the mold model of FIG. 4 is housed into the lower part (2b) of the pressure container, and the molding material of the specific compounding ratio described above and mixed into fluid form is poured into the gap between the mold model and the part (2b) and, then the molding material is cured. When the molding material is cured, the hanger for mold (2a) of the pressure container is interlocked with the part (2b), and the molding material having the specific compounding ratio previously described mixed into fluid form, is poured between the mold model and the hanger for mold (2a) to be cured. After separating the pressure container (2) at the end, the mold model of FIG. 4 is removed and the inner molds (3, 3'), having the water discharge channels (5, 5') in the pressure container, are completed and serve as a casting mold.

Piping of said casting mold is arranged in the following way. An overflow tank (9) is connected to an overflow pipe (7) an incorporates a liquid level detector (10), and a pipe with a 4-way valve (11) is connected to the top of the overflow tank. The 3-way valve (11) is opened towards the outside at one end, and the other end is connected to an air compressor (not illustrated).

The external pipe (8, (8')) is connected to the discharge channel (5, (5')) at one end and the other end is connected to an air separator (12, (12')). A drain valve (13, (13')) and a 3-way valve (14, (14')) are attached to the air separator (12, (12')). One the one end of the 3-way valve (14, (14')) is connected to an air compressor (not illustrated), and the other end is connected to a pressure reducer (not illustrated). The slip feed pipe (6) is connected to the valve (22) of a slip feed and discharge unit (15) through a flexible pipe (16). The flow inlet of a pump (18) is connected to the bottom of a slip tank (17). A valve (19) connected to the discharge outlet of the pump (18) and a valve (21) attached to a discharged slip return pipe (20) are connected to the valve (22) of the slip feed and discharge unit (15). The cart (27) is for carry-out of molded articles, provided with a table lifter (29) having a carry-out conveyer (28) attached to the surface, and is composed to move back and forth from the stand-by position (shown by the alternate long and two short dashes line in FIG. 3) to the receiving position (shown by a continuous line in FIG. 3). A loading base (30) of pallet type is placed on the carry-out conveyer (28).

Figure 2:
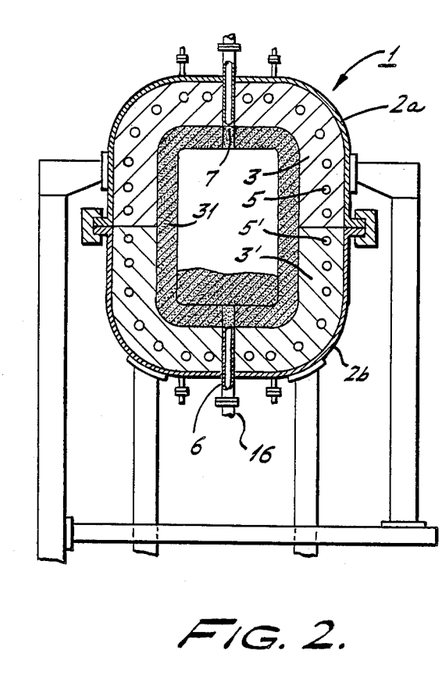
FIG. 2 and FIG. 3 are sectional views of an embodiment of the molding method with the slip casting mold.

The slip discharge casting system is operated as follows. First the slip, pressurized by the pump (18) is supplied to the casting space (4) formed by interlocking the upper portion (2a) and the lower portion (2b) of the pressure container (2). Slip supply is conducted through the valves (19, 22), the flexible pipe (16) and the slip feed pipe (6). While the slip is supplied, the valve (11) is opened to atmospheric air. When the supplied slip overflows from the overflow pipe (7) and goes up into the overflow tank (9), the liquid level detector (10) functions to stop the pump (18) and to close the valve (22). Then compressed air (5-15 kg/cm² for example) is supplied into the overflow tank (9) by operating the valve (11) to pressurize the slip in the casting space (4), and the valves (13, 13') are opened to turn the pressure in the air separators (12, 12') to atmospheric pressure, or the valves (13, 13') are closed and the valves (14, 14') are operated to turn the pressure in the air separators (12, 12') to a negative pressure condition (300-700 mmHg for example). By this operation, the solid matter in the pressurized slip in the casting space (4) is quickly deposited onto the surface of the inner molds (3, 3') as the moisture content in the slip goes out into the discharge channels (5, 5') of lower pressure through the inner molds (3, 3'). (Refer to FIG. 2.) After deposition of the solid slip for a specified time (about 9 minutes for 9 mm thickness for example), the valve (11) is operated to change the inside of the overflow tank to atmospheric pressure, and the valves (22, 21) are opened to return the extra slip solids not deposited in the casting space (4) to the slip tank (17) through the slip feed pipe (6), the flexible pipe (16), the valves (22, 21) and the slip return pipe (20). After discharging the slip, the valve (22) is closed as required and the valve (11) is operated to supply compressed air into the overflow tank (9), to pressurize the deposited wall from inside, and to reduce moisture content of the deposited wall evenly. While the non-deposited slip is discharged and the deposited wall is again pressurized, the inside of the air separators (12, 12') is kept at atmospheric or negative pressure condition by the operation as described above.

Figure 3:
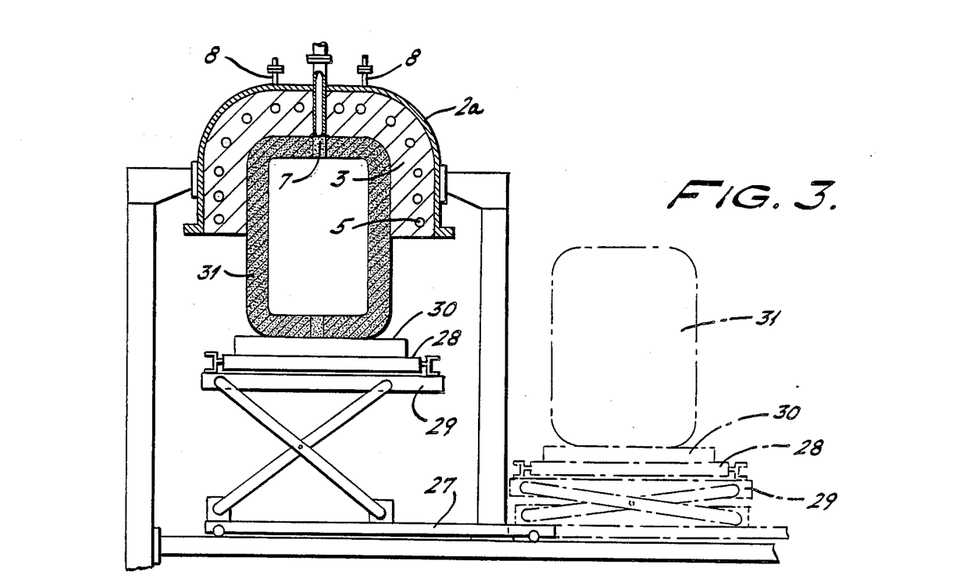

Then the inside of the air separator (12) is turned to a negative pressure condition, the valve (13') is closed, the valve (14') is operated to supply compressed air into the air separator (12'), the residual moisture in the inner mold (3') is pressed out to the boundary between the surface of the inner mold (3') and the desposited wall of the casting being made to form a water film, the lower part (2b) of the pressure container (2) is lowered to separate from the upper part of the casting (2a), then the mold (31) is adhered to the inner mold (3) to be hung for holding as shown in FIG. 3. The mold cart (27) is moved to the lower part of the hanging mold (31), and the table lifter (29) is raised to put the loading base (30) closer to the bottom of the mold (31). By operating the valve (14), compressed air is supplied into the air separator (12) to pressurize the inside of the discharge channel (15), to squeeze out the residual water in the inner mold (3) to the boundary between the surface of the inner mold (3) and the cast mold (31), to form a water film, and to naturally drop the mold (31) onto the loading base (30). Finally, the table lifter (29) is lowered, the mold cart (27) is retracted to the stand-by position shown by the alternate long and two short dashes line in FIG. 3, and the hollow molded article (31) placed on the loading base (30) is obtained.

Being made having the molding materials of the specific compounding ratio described earlier, the inner molds of the slip discharge casting system have the following advantages. The inner molds are subjected to almost no curing shrinkage and the dimensional stability is excellent. When the casting mold is made by the method described above, therefore, gaps will be hardly formed between the mold and the pressure container, and leakage of slip material is less likely to through occur gap any formed at the fitting part of the inner molds. It is also possible to make the size or shape of the casting space to correspon exactly to the size and shape of a desired molded article. It is, therefore, possible to obtain a mold of high dimensional accuracy. The dimensional accuracy is high even when the molded articles have intricate shapes, and the dimensional dispersion can be very small even when the mold is used repeated by. The inner molds can also be made highly durable as the overall performance of the excellent water resistance, mechanical characteristics, wear resistance and chemical resistance, which makes it possible to make a great number of molds without the fear of attack by chemicals, dissolution in water, or breakage. As the inner molds can be provided with a high heat resistance, breakage by heat can be minimized when the slip temperature is increased. Moreover, the shape and wall thickness of the obtained mold can be homogeneous because the inner molds can be provided with dimensional stability and with even and continuous holes.

When the inner molds are made of plaster, on the other hand, the following troubles result. Plaster molds are inferior in wear resistance, strength, and chemical resistance. When used repeatedly, therefore, wear and corrosion by chemicals are advanced and the strength is also lowered. When applied to slip discharge casting, therefore, plaster fails to make many products with a high dimensional accuracy, and the maximum number of products which can be molded is several hundreds pieces only.

When inner molds are made by the methods in the above stated Japanese Patent Publication Nos. 53-2464, 51-46131, 55-19723, and Provisional Publication No. 59-71339, the dimensional stability becomes lower due to curing shrinkage. Leakage of slip is, therefore, more likely to occur through gaps formed at the juncture of the inner molds to each other. As it is difficult to accurately make the size or shape of the casting space suitable to the size and shape of the desired mold molded products of high dimensional accuracy can hardly be obtained. Breakage due to heat and other causes is also more likely as the heat resistance and durability are inferior to the inner molds made of the molding materials of the specific compounding ratio described above.

The following description is of an embodiment of manufacturing the casting mold using the casting mold of the invention as the inner mold.

Typical formulations for the inner molds are as follows;

| | | Parts by Weight |
|---|---|---|
| Resin component: | Epoxy resin | 100 |
| Emulsifiers: | Sorbitan aliphatic ester. | 8 |
| | Polyoxyethylene oleyl ether. | 8 |
| | Polyoxyethylene Sorbitan aliphatic ester. | 8 |
| Hardener: | Modified aliphatic polyamine (Hardener A described above). | 30 |
| Fillers: | Ceramic powder | 220 |
| Water | | 50 |

First, the resin component, hardener, emulsifiers, and water are mixed, then the fillers are added. The molding material is then prepared by fully mixing to fluid condition. While a wire net is pressed against and onto the surface of a model molded larger than the casting mold product by the distance between the surface of the inner molds and the water discharge channels (5, 5') (70 mm) to prepare a wire net of the shape which corresponds to the shape of the inner molds. Then the pipes for discharge channels of 7 mm outside diameter and made of woven cotton are placed on the wire net at pitch of 35 mm and are fixed with wire. (See FIG. 4.) The wire net is housed inside the hanger 2a for the mold and of the other part 2b, and the pipes for discharge channel are inserted into the pipe line of the external piping of the pressure container. Then the corresponding parts of the molded model are housed into the hanger for the mold and other part of the pressure container. Then the above mentioned molding material is poured into the gap between the mold model and the other part other than the molded article hanging part, and the temperature is kept at a level suitable for viscosity and gellation of the molding material (30°–55° C.). The condition is kept for the specified time to gel the molding material. Then the hardened material is heated gradually to remove water and emulsifiers from the cured material (from 35° C. to 70° C.), and to obtain complete porous inner molds. Then the molding material is poured into the gap between the molding model and the hanger for the mold, the material is cured in the same manner as above, and water and the emulsifiers are removed to obtain porous inner molds. Finally, the pressure vessel is separated to take out the molding model, and the inner molds having water discharge channels are completed in the pressure vessel to obtain a casting mold.

When molded products were made by using a slip casting system provided with the casting molds, the inner molds, were excellant in dimensional stability, durability, heat resistance and water resistance, which made it possible to manufacture more than 20,000 pieces of molded products of high dimensional accuracy continuously and without leakage of the slip.

We claim:

1. A casting mold containing continuous pores, used for slip discharge casting, said casting mold comprising a molded material produced from a molding mixture which includes
   (a) an epoxy compound having one or more epoxy groups in each molecule,
   (b) a hardener which reacts with and hardens the epoxy compound,
   (c) an emulsifier capable of preparing an epoxy emulsion, which emulsifier comprises at least two nonionic emulsifiers selected from the group consisting of a sorbitan aliphatic acid ester having a hydrophile-lipophile balance value of about 4-8, a polyoxyethylene oleylether having a hydrophile-lipophile balance value of about 8-17, and a polyoxyethylene sorbitan aliphatic acid ester having a hydrophile-lipophile balance value of about 11-15.6,
   (d) water, and
   (e) filler, the components being present at a ratio of 20-50 parts by weight of hardener to 100 parts by weight of epoxy compound, 30 parts by weight or less of emulsifier to 100 parts by weight of total epoxy compound and hardener, 1-200 parts by weight of water, and 30-75wt% of filler in the mixture of molding.

2. A casting mold in accordance with claim 1 in which the emulsifier is mixed preliminarily with at least either one of the epoxy compounds or the hardener.

3. A casting mold as set forth in claim 1 wherein the filler comprises substantially spherical particles.

4. A casting mold according to claim 1, in which the molding material includes an antifoaming agent.

5. A casting mold according to claim 1, in which the molding material is heated after gelation of the material to remove water and emulsifiers therefrom and conduct further curing.

6. A casting mold according to claim 1, wherein 1-200 parts by weight of a water solution of a fluorine containing surface active agent is added in place of said water.

7. A casting mold according to claim 1, wherein the ratio of at least two of said emulsifiers is such that the resulting emulsion has a hydrophile-lipophile balance value in the range of about 13 to about 14.5.

8. A casting mold according to claim 1, wherein substantially the same weight quantity of said nonionic emulsifiers is used.

* * * * *